Feb. 19, 1963 W. G. FROEDE 3,077,867
MULTIPLE ARRANGEMENT OF ROTARY COMBUSTION ENGINES
Filed Oct. 6, 1959 9 Sheets-Sheet 1

INVENTOR.
WALTER G. FROEDE
BY
ATTORNEY

Feb. 19, 1963 W. G. FROEDE 3,077,867
MULTIPLE ARRANGEMENT OF ROTARY COMBUSTION ENGINES
Filed Oct. 6, 1959 9 Sheets-Sheet 2

INVENTOR.
WALTER G. FROEDE
BY
ATTORNEY

Feb. 19, 1963   W. G. FROEDE   3,077,867
MULTIPLE ARRANGEMENT OF ROTARY COMBUSTION ENGINES
Filed Oct. 6, 1959   9 Sheets-Sheet 3

FIG. 7

INVENTOR.
WALTER G. FROEDE
BY
ATTORNEY

Feb. 19, 1963 W. G. FROEDE 3,077,867
MULTIPLE ARRANGEMENT OF ROTARY COMBUSTION ENGINES
Filed Oct. 6, 1959 9 Sheets-Sheet 8

INVENTOR.
WALTER G. FROEDE
BY
ATTORNEY

Feb. 19, 1963 W. G. FROEDE 3,077,867
MULTIPLE ARRANGEMENT OF ROTARY COMBUSTION ENGINES
Filed Oct. 6, 1959 9 Sheets-Sheet 9

FIG. 17

INVENTOR.
WALTER G. FROEDE
BY
ATTORNEY

United States Patent Office 3,077,867
Patented Feb. 19, 1963

3,077,867
MULTIPLE ARRANGEMENT OF ROTARY
COMBUSTION ENGINES
Walter Gray Froede, Neckarsulm, Germany, assignor to
NSU Motorenwerke Aktiengesellschaft, Neckarsulm,
Germany, and Wankel G.m.b.H., Lindau (Bodensee),
Germany
Filed Oct. 6, 1959, Ser. No. 844,729
Claims priority, application Germany Oct. 7, 1958
13 Claims. (Cl. 123—8)

This invention relates to rotary internal combustion engines and is particularly directed to multiple arrangements of such engines.

A known form of rotary internal combustion engine comprises a fixed housing having a cavity formed by axially spaced end walls interconnected by a shell having a multi-lobed inner peripheral wall, a shaft co-axial with said cavity extends therethrough, said shaft having an eccentric or crank portion on which a rotor is journaled. This rotor is received between the end walls of said cavity and has a plurality of circumferentially-spaced apex portions slidably engaging said housing peripheral wall to form a plurality of working chambers between said rotor and wall which vary in volume upon rotation of said rotor. Such an engine also includes suitable intake and exhaust ports and ignition means so that during engine operation each working chamber undergoes a four-cycle process similar to that of conventional reciprocating internal combustion engines in that the working fluid in said chamber undergoes the four strokes of intake, compression, combustion and expansion and exhaust.

Engines of this type are fully described in copending application Serial No. 774,517 filed November 17, 1958, now Patent 2,988,065 granted June 13, 1961.

The power output of such rotary combustion engines can be increased by increasing the diameter of the rotor and its housing. However, the extent to which the engine power can be increased in this way is limited for example by the speed at which the rotor apex portions slide along the peripheral wall of the engine housing. According to the invention the power output of such rotary combustion engines is increased by combining a member of such rotary engines. This has advantages similar to the advantages resulting from increasing the number of piston-cylinder units of conventional reciprocating type combustion engines. Combining a plurality of rotary engines into a single power plant for increasing the power output has the following main advantages over increasing the diameter of the engine;

(a) Lower sliding speed of the rotor apex portions along the peripheral wall of the housing;
(b) More complete burning of the combustion charge because the working chambers are of smaller size;
(c) Lower tendency of the engine to knock
(d) More favorable conditions for cooling the engine
(e) More ignition firings per revolution and therefore a smoother engine torque output.

These advantages make it possible to design the engine with a higher power to weight ratio.

An object of this invention comprises the provision of novel arrangements for combining a plurality of rotary combustion engines.

In one embodiment of the invention two rotary engine units are combined into a double engine power plant having one output shaft in such a way that the two housing cavities have their profiles axially alined while the shaft crank portions for the two engine units and the two rotors journaled on said crank portions are offset 180°. In addition the intake ports of the two units are disposed one behind the other along a line parallel to the crankshaft axis, that is, said intake ports are axially alined as are the exhaust ports.

A further feature of such a double engine power plant resides in the provision of a common inlet passage for both units disposed in the housing wall between the two units, said common inlet passage having an inlet port in the adjacent side wall of each unit and said ports are alined one behind the other along a line parallel to the crankshaft axis. Also the outlet passages of the two units extend substantially radially from the two housings and are similarly axially aligned one behind the other.

With this arrangement the shell and end walls of one housing cavity can be made identical with the shell and end walls of the other housing cavity. This feature as well as the alinement of the ports simplifies the fabrication of the engine. Also since the rotating masses of the double engine are offset 180° they can easily be balanced by external counterweights. The common inlet passage of the double engine can be disposed in a common partition wall between the two engines thereby making a very compact power plant. A common inlet passage also results in the same charge and fuel-air mixture distribution for both engine units and makes it possible to operate the power plant with only one carburetor. In addition, the arrangement results in the engine firings occurring at regular intervals of crankshaft rotation.

A further feature of the invention comprises a combination of the aforedescribed double rotary engines with larger power plants, for example a power plant with two such double engines. A few examples of such quadruple power plants are given from which it is evident that additional double engines may be added to make even larger engines.

The following factors are advantageous in any multiple rotary engine power plant:

(a) Perfect balancing of the rotary masses without counterweights
(b) Uniform interval between the firing of the working chambers.
(c) Axially alined positions for the inlet passages of the rotary engine units as well as for the outlet passages.

It has been found that only two of these three factors can be obtained with any one quadruple rotary engine power plant.

One form of quadruple engine can be made by combining two said double engines in such a way that the profiles of their housing cavities are all axially alined but the crankshafts of the two double engines are 180° out of phase. With this arrangement the rotating parts of the engine are in balance and the inlet passages of the engine units are axially alined as are their outlet passages. With this arrangement, however, the ignition firing sequence is not the best because ignition firing always occurs simultaneously in two units.

Another quadruple arrangement of two said double engines consists in having the profiles of the engine housing cavities axially alined but having the crankshafts of the two double engines offset 90° relative to each other. With this arrangement the inlet and outlet passages are again axially alined and in addition a uniform ignition firing sequence is obtained. However, the rotating parts of this quadruple engine arrangemnet require counterweights for balance.

A third quadruple arrangement of two double engines consists in having the profiles of the engine housing cavities of one double engine offset 90° from the other with their crankshafts offset 180°. With this arrangement the rotating parts of the engine are in balance and therefore no counterweights are required. Also a uniform firing sequence is obtained. However, the inlet and outlet passages of each double engine are rotatively offset from those passages of the other double engine.

In the first of the above described quadruple arrangements the adjacent engine units of the two double engines are identical both with respect to their housings as well as to their rotors. It is possible therefore to combine these two identical engine units into one unit of double width.

Other objects of the invention will become apparent upon reading the annexed detail description in connection with the drawing in which.

Referring first to FIGS. 1–4 of the drawing, there is shown a double engine consisting of two similar rotary engnie units. FIGS. 1–4 show each engine unit in transverse section. For clarity of illustration, however, the two engine sections are shown one above the other instead of, as in the actual engine, one behind the other.

Each engine unit consists of a fixed housing 1 each having a similar cavity 2 formed by axially spaced end walls and a peripheral wall having the profile of a two-lobe epitrochoid. The center of each housing cavity 2 is indicated at 3 and the engine crankshaft 4 has two eccentric or crank portions 5 and 6, one for each engine unit and on which similar engine rotors 7 tand 8 respectively are journaled. The centers of the crankshaft eccentric portions 5 and 6 are indicated at 9 and 10 respectively and the direction of rotation of these eccentric centers about the crankshaft axis is shown by the arrows on the drawnig.

Each rotor 7 and 8 has three apex portions each with a sealing strip 11 slidably engaging the peripheral wall of the cavity to form three working chambers between said rotor and peripheral wall which vary in volume upon rotation of said rotor, said three working chambers are designated R1, R1′ and R1″ for the upper engine unit in each of FIGS. 1–4. The lower engine unit has three similar working chambers. Each rotor 7 and 8 is interconnected with the crankshaft 4 by suitable gearing (not shown in FIGS. 1–4) to insure predetermined planetary rotation of each rotor within its associated housing cavity 2 so that said sealing elements 11 continuously engage the peripheral wall of its housing cavity 2.

Each housing 1 has an inlet port 12 formed in one of its end walls and an outlet port 13 extending through its peripheral wall.

As can be seen in FIGS. 1–4 the profiles of the cavities 2 of the two housings 1 are axially alined. In addition the inlet ports 12 are likewise axially alined, that is, when viewed in a direction parallel to the crankshaft axis the one inlet port 12 is directly behind the other. The outlet ports 13 are also axially alined. The two crankshaft eccentric portions 5 and 6 and their rotors 7 and 8 are however rotatively offset by 180°. As a result when one working chamber associated with the rotor 7 is at its minimum volume position at the end of the exhaust stroke a working chamber associated with the rotor 8 is at its minimum volume position at the end of compression stroke so that said working chambers are 180° out of phase. However as to the relative rotative positions about their individual axes, the rotors 7 and 8 are displaced 60° relative to each other as is evident in FIGS. 1, 2, 3 and 4.

Figure 1:
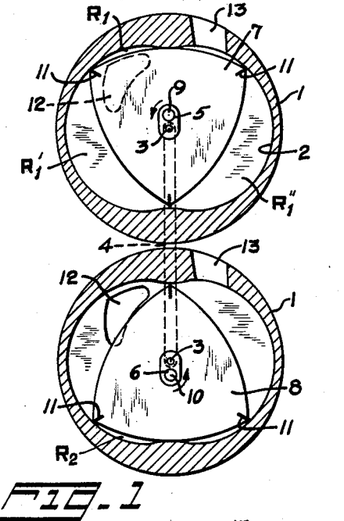
FIG. 1 is a schematic transverse view of a double engine power plant forming part of the invention, each engine being shown in transverse section which for clarity of the drawing are shown one above the other although in an actual engine the one section would be directly behind the other.
Figure 2:
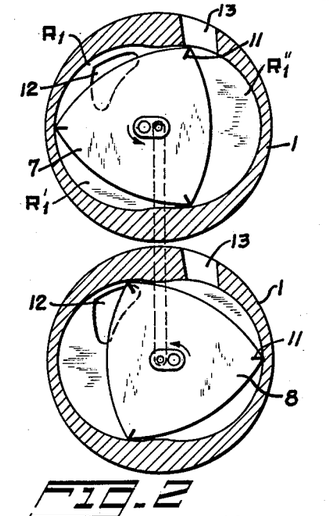
FIGS. 2–4 are views similar to FIG. 1 but showing the different positions of the engine rotors.
Figure 3:
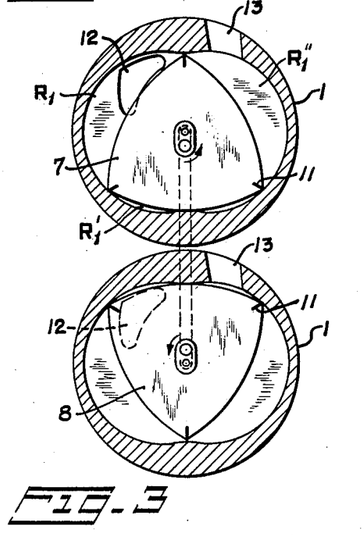
Figure 4:
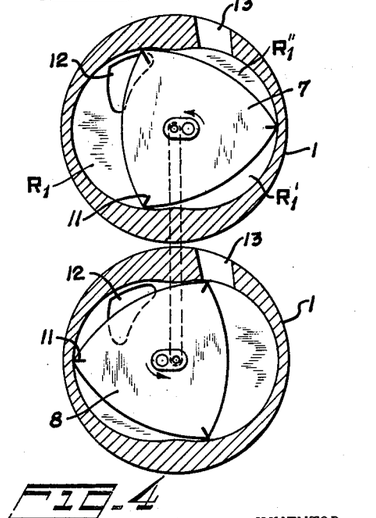

FIGS. 1–4 show the positions of the rotor and working chambers in steps of 90° of crankshaft rotation. In FIG. 1 working chamber R1 of the upper engine unit is at its minimum volume position following completion of the exhaust stroke. In FIG. 2 the inlet port 12 has opened to the chamber R1 while the outlet port 13 has been closed to said chamber. The chamber R1 increases in volume from FIGS. 2 to 3 until it reaches its maximum volume at FIG. 4. The next 90° of crankshaft rotation would bring the chamber R1 to the same position as the chamber R1′ has in FIG. 1 so that following FIG. 4 the next portion of the cycle of chamber R1 can be followed by considering chamber R1′. The inlet port 12 is now closed (FIG. 1) to chamber R1′ and it decreases in volume until the minimum volume position of FIG. 3 is reached whereupon ignition occurs and in FIG. 4 chamber R1′ has started to expand. The remainder of the working cycle of chamber R1 can be traced by going back to FIG. 1 and considering chamber R1″ which reaches its maximum volume position in FIG. 2 at which point said chamber opens to the exhaust port 13. FIGS. 3 and 4 show successive steps in the exhaust stroke and in the next 90° of crankshaft rotation following FIG. 4 the chamber R1 returns to its starting minimum volume position of FIG. 1.

Each of the other working chambers of the upper engine unit have a similar cycle of operation as do the working chambers of the other or lower engine unit. It can be seen from the views of FIGS. 1–4 that the firing positions of the working chambers of the upper engine unit are staggered 180° as regards their cycle, from those of the lower engine unit. For example, in FIG. 1 the chamber R1 of the upper unit is at the end of the exhaust stroke while the chamber R2 of the lower unit is 180° out of phase or at the end of its compression stroke.

Figure 5:
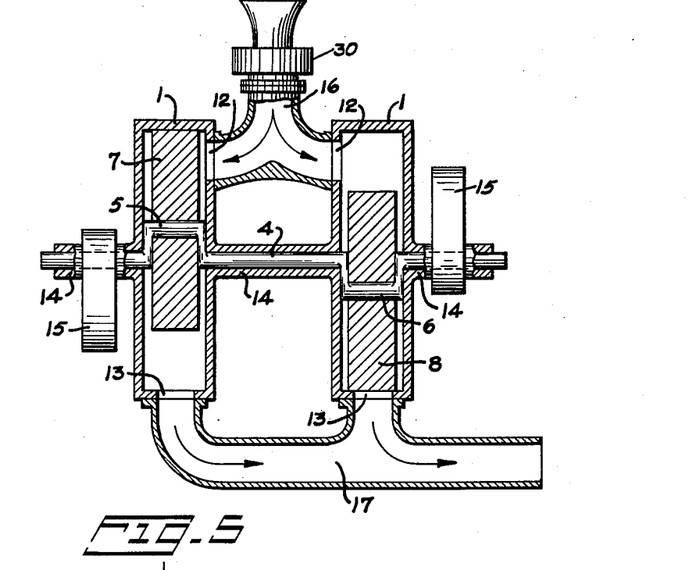
FIG. 5 is a schematic axial sectional view of the engine of FIGS. 1–4.

As illustrated in FIGS. 1–4 and in FIG. 5 the two eccentric or crank portions 5 and 6 of the shaft 4 are rotatively displaced 180° relative to each other. As shown in FIG. 5 the shaft 4 is journaled in the housing 1 at 14 and is provide dwith counterweights 15 to balance the centrifugal forces on the eccentric rotating parts.

Figure 6:
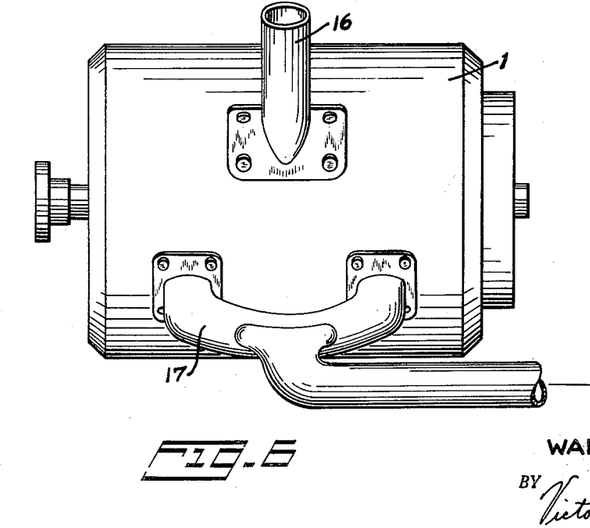
FIG. 6 is a plan view of the housing of the engine of FIGS. 1–4 and showing the inlet and outlet passages.

As already stated the inlet ports 12 are axially alined. As seen in FIGS. 5 and 6 this makes it very easy to provide a common inlet conduit 16 connected to the inlet ports 12 of the two units of the double engine so that the intake passages of the two units are identical. A single carburetor 30 may be provided for controlling the supply of fuel and air to both units through the common intake conduit 16.

The outlet ports 13 are also axially alined. A common exhaust conduit 17 is connected to said outlet ports, said exhaust conduit being of simple shape and providing identical exhaust passages for the two exhaust ports.

Figure 7:
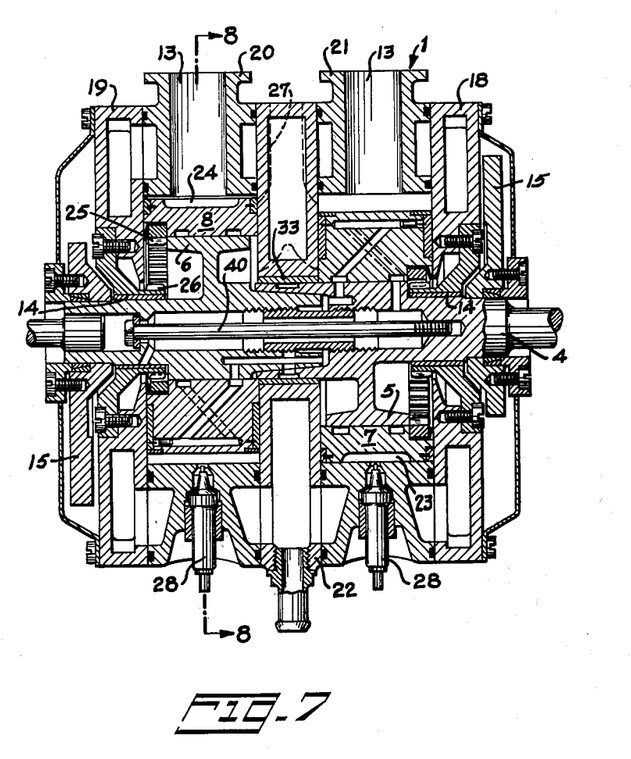
FIG. 7 is a detailed axial sectional view of the engine of FIGS. 1–4 and taken along line 7—7 of FIG. 8.
Figure 8:
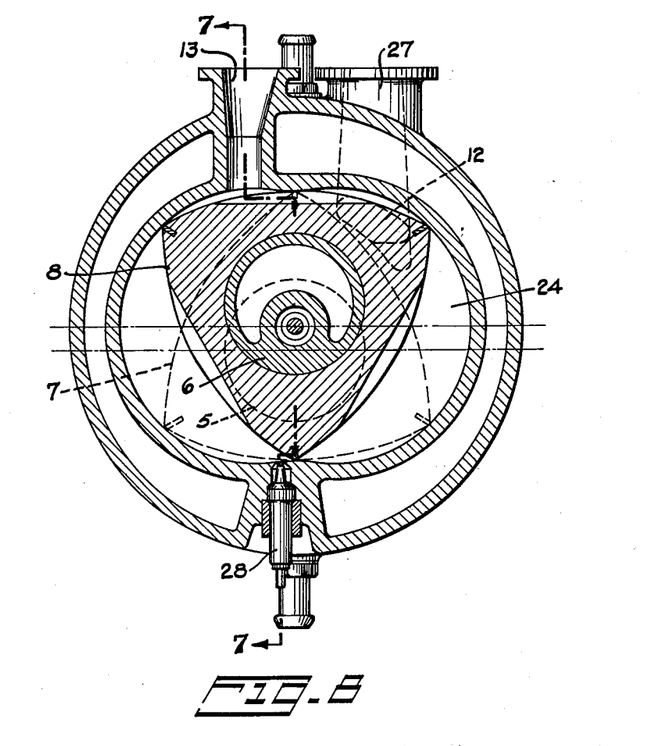
FIG. 8 is a sectional view taken along line 8—8 of FIG. 7.

Reference is now made to FIGS. 7 and 8 which show structural details for a double rotary engine such as schematically shown in FIGS. 1–6.

In FIGS. 7 and 8 the double engine has a common housing structure 1 formed by end walls 18 and 19, peripheral wall parts 20 and 21 and a common intermediate wall 22. The peripheral wall 20 is connected between the end wall 19 and the intermediate wall 22 to form a housing cavity 24 therebetween. The peripheral wall 21 is connected between the end wall 18 and the intermediate wall 22 to form the housing cavity 23. The housing cavities 23 and 24 each have the two lobed epitrochoidal profile shown in FIG. 8 and their profiles are axially alined.

The end walls 18 and 19 of the double engine housing have bearings 14 within which the engine crankshaft 4 is journaled, the axis of said shaft being co-axial with said housing cavities 23 and 24. The crankshaft 4 has two eccentric portions 5 and 6 one for each of the housing cavities 23 and 24. Rotors 7 and 8 are journaled on the eccentric portions 5 and 6 respectively and as can best be seen in FIG. 8 the crank or eccentric portions 5 and 6 of the shaft are rotatively offset 180° as also are the rotors 7 and 8.

An internal gear 25 is secured to the rotor 8 co-axial with said rotor and an external gear 26 co-axial with the shaft 4 is secured to the housing end wall 19. Said gears 25 and 26 are disposed in meshing engagement to insure the relative planetary rotation of the rotor 8 within the housing cavity 24. Similar gearing is provided between the housing end wall 18 and the rotor 7. For simplicity such gearing has not been shown in the schematic views of the drawing.

An exhaust gas outlet port 13 is provided in each peripheral wall 20 and 21, said outlet ports being disposed axially one behind the other along a line parallel to the engine axis. A common inlet passage 27 is formed in the intermediate wall 22, said passage ending in two inlet ports 12 one for each of the housing cavities 23 and 24. Said inlet ports are also disposed axially one behind the other. Each peripheral wall 20 and 21 also includes a spark plug 28 for the associated housing cavity 24 and 23 and the counterweights for rotatively balancing the engine are shown at 15. Also the intermediate wall 22 has a bearing 33 for the crankshaft 4.

Figure 9:
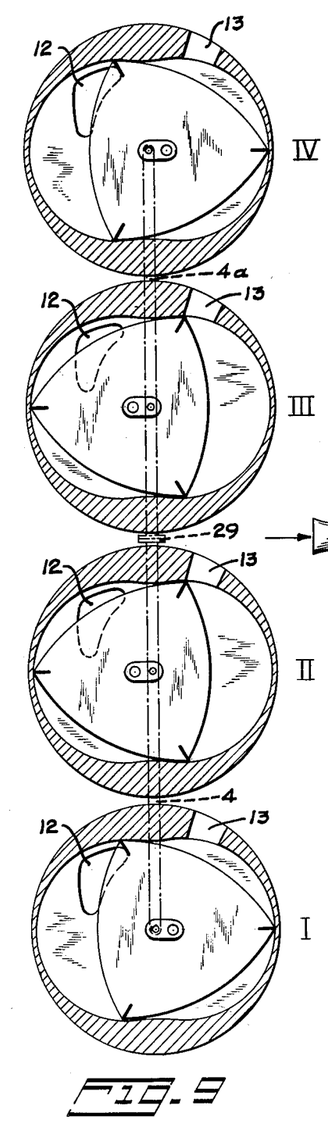
FIG. 9 is a schematic transverse view of quadruple engine arrangement embodying the invention in which again for reasons of clarity the engine sections are shown one above the other although in an actual engine said sections would be one behind the other.
Figure 10:
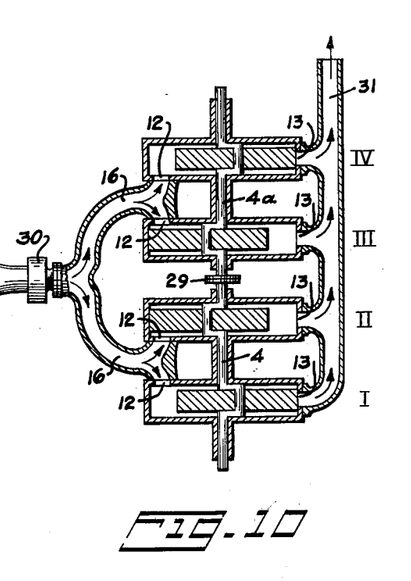
FIG. 10 is a schematic axial sectional view of the engine of FIG. 9.

Reference is now made to FIGS. 9–10 which disclose a quadruple engine comprising two double rotary engines such as shown in FIGS. 1–8. The one double engine consists of units I and II and the other double engine consists of units III and IV each said double engine operates as explained in connection with FIGS. 1–4. The crankshaft 4 for the double engine I and II is serially connected to the crankshaft 4a for the double engine III and IV by a coupling 29 so that as illustrated said crankshafts are rotatively offset 180°. The profiles of the housing cavities of the engine units are all axially alined and their intake ports 12 are also axially alined as are their exhaust ports.

As is apparent from FIG. 10, the rotating parts of the quadruple engine are in balance and therefore no special balancing counterweights are required. The two intake ports of each double engine unit can be connected to a single intake conduit 16 with the two intake conduits for the two double engines being identical and connected to a common carburetor. Also all the outlet ports can be similarly connected to an exhaust manifold running parallel to the engine axis.

It should be apparent therefore that the quadruple engine of FIGS. 9–10 can have balance of its eccentric rotating masses without special counterweights and that the inlet and exhaust ports are all axially alined. On the other hand it is clear from FIG. 9 that the units I and IV are in phase and that therefore the firings of the working chambers of unit I will occur simultaneously with the firings of the working chambers of unit IV. Similarly the chambers of units II and III will fire simultaneously. It is apparent therefore that the quadruple engine of FIGS. 9–10 does not have a uniform firing interval between the firing of the individual working chambers.

Figures 11, 12:
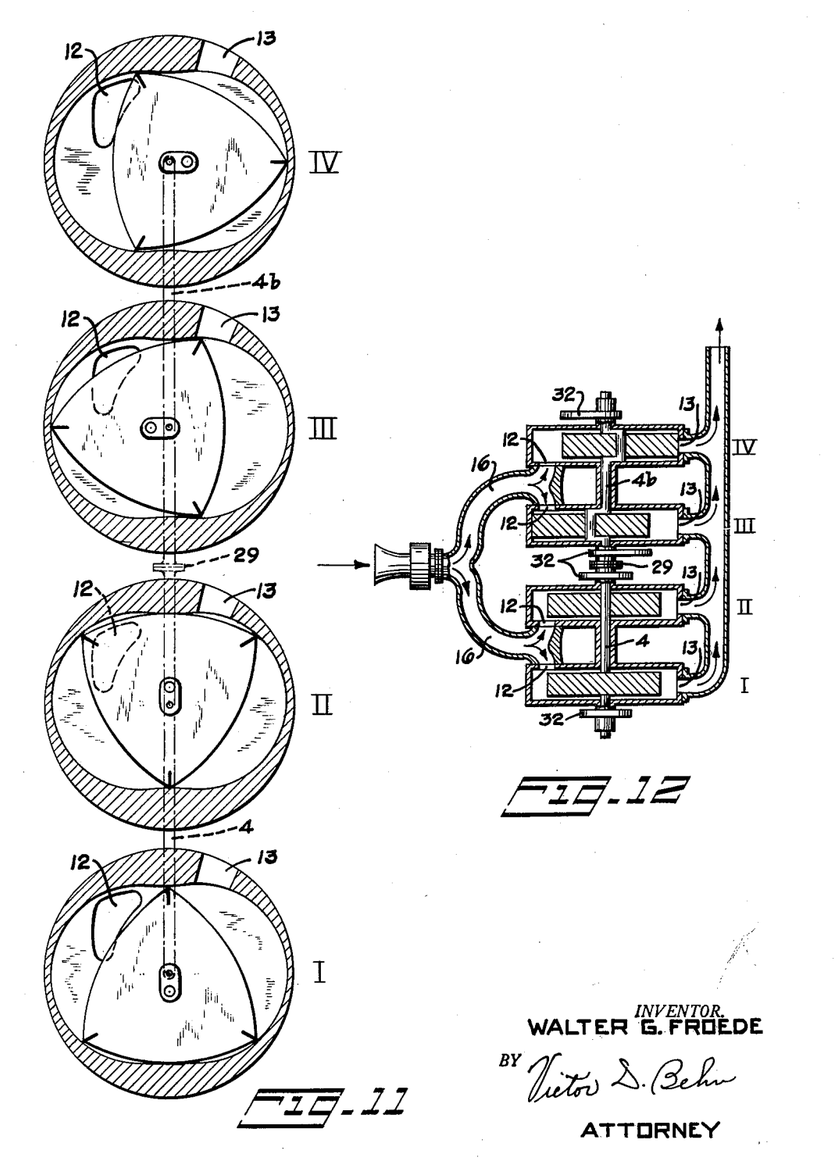
FIG. 11 is a view similar to FIG. 9 but illustrating another quadruple arrangement.
FIG. 12 is a schematic axial sectional view of the engine of FIG. 11.

Reference is now made to FIGS. 11 and 12. These figures show a quadruple engine which is similar to that of FIGS. 9–10 except that the crankshaft 4b for the double engine consisting of units III and IV is coupled to the crankshaft 4 of the double engine consisting of units I and II so as to be rotatively displaced 90° therefrom instead of 180° as in FIGS. 9–10. The profiles of the housing cavities and their inlet and outlet ports are all axially alined in FIGS. 11–12 as in FIGS. 9–10. As is evident from FIG. 11, the rotative positions of the rotors of units I and II are rotatively displaced 60° relative to each other about their axes as are the rotors of units III and IV while the rotors of units I and III and the rotors of units II and IV are rotatively displaced 30° relative to each other.

As is apparent from FIG. 12 separate counterweights 32 are required for balancing the eccentric rotating masses. However, the quadruple engine of FIGS. 11–12 has a uniform interval of 90° of shaft rotation between each firing stroke and the inlet and outlet ports are axially alined so that they can be connected as in FIGS. 9–10.

Figures 13, 14:
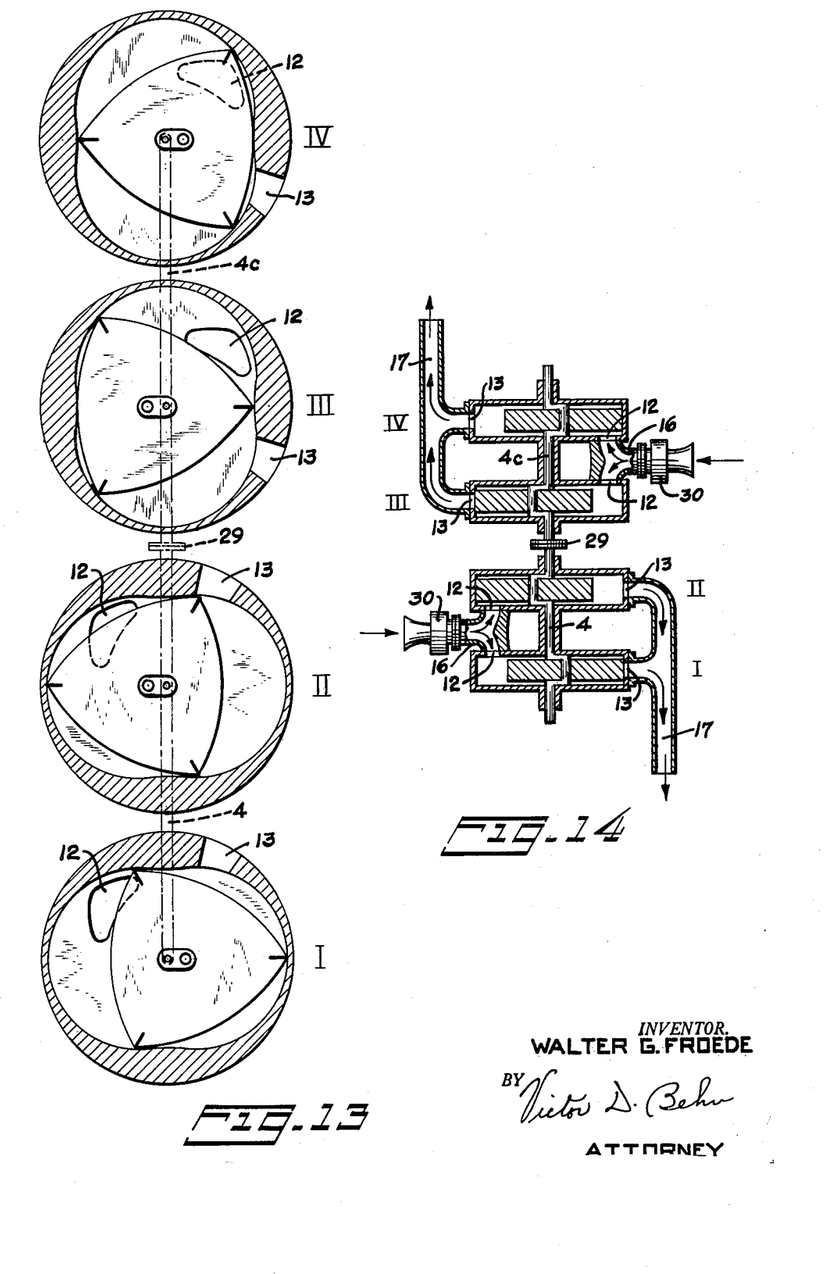
FIG. 13 is a view similar to FIG. 9 but illustrating still another quadruple arrangement embodying the invention.
FIG. 14 is a schematic axial sectional view of the engine of FIG. 13.

Still another quadruple engine arrangement is shown in FIGS. 13–14. In this arrangement the profiles of the housing cavities of the double engine made up of engine units I and II are rotatively displaced 90° from the housing cavities of the double engine made up of engine units III and IV. In addition the crankshaft 4c of the double engine consisting of units III and IV is rotatively offset 180° from the crankshaft of the double engine consisting of units I and II.

With this latter quadruple engine the rotating eccentric masses of the engine are in balance without any special balancing counterweights as can be seen from FIG. 14. Also there is a uniform firing sequence in that the firing strokes occur at uniform intervals of 90° of rotation of the engine shaft. However, in FIGS. 13–14 the inlet ports of the two double engines are not axially alined nor are the outlet ports of said double engines. Thus each double engine has its own carburetor 30 and each has its own exhaust conduit 17.

Figure 15:
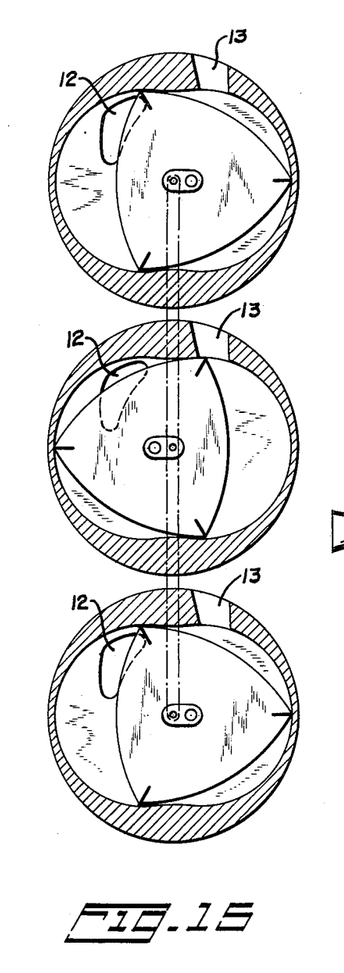
FIGS. 15 and 16 are views similar to FIGS. 9 and 10 in which the two adjacent engine units of the two double engines are combined into a single unit of double width.
Figure 16:
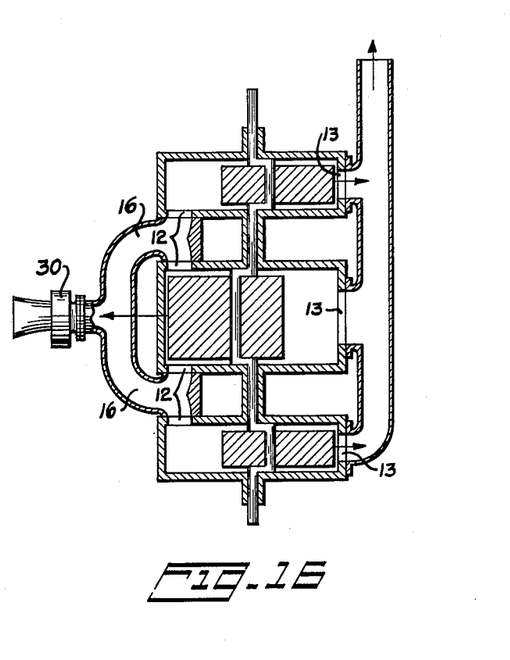

In the quadruple engine of FIGS. 9–10, the two middle engine units II and III are such that their housing cavities as well as their rotors are axially alined. Accordingly, this quadruple engine can be simplified by combining said two middle units into a single unit of double width. Such a triple engine is shown in FIGS. 15–16. By making the middle unit of double width the eccentric rotating masses are again in balance without the necessity of separate counterweights. Also the inlet conduits 16 are connected to inlet ports 12 at opposite end walls of the middle unit as well as to a single inlet port for each of the other two units. Accordingly, the inlet passages 16 in FIGS. 15–16 are substantially the same as in FIGS. 9–10 as are the exhaust passages.

Figure 17:
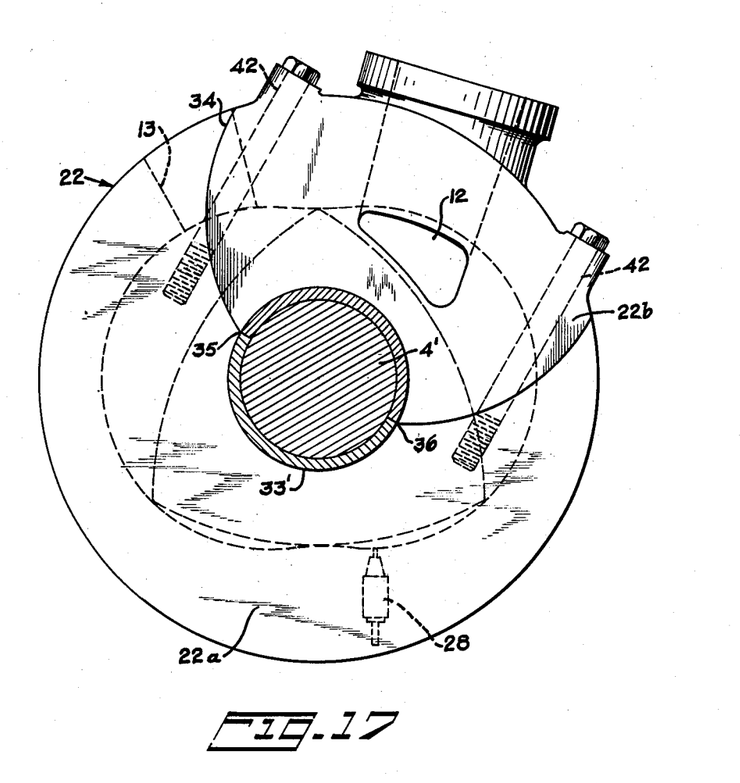
FIG. 17 is a sectional view showing a modification of a structural detail of FIGS. 7 and 8.

As shown in FIG. 7 the crankshaft for each double engine unit consists of two parts clamped together by a bolt 40 to facilitate assembly of the engine. It is possible, however, to use a one piece crankshaft 4' by splitting the intermediate wall 22 of the double engine unit as illustrated in end view in FIG. 17. As there shown the parting junction 34 of the two parts 22a and 22b of the intermediate wall 22 is made in the form of a circular arc which ends at diametrically opposite sides of the crankshaft bearing 33'. The crankshaft bearing is likewise split as shown at 35 and 36 into two semi-cylindrical halves. The circular arc parting junction 34 is located so that the inlet port 12 is within the part 22b cut off by said circular arc parting junction 34. With this arrangement the parting junction 34 is not exposed to the working chambers when relatively high pressures exist in said chambers. In addition, with this location of the junction 34, the cut-off part 22b is on the side of the housing which requires relatively little or no cooling since combustion takes place on the other side of the housing. Accordingly, the amount of cooling provided for the cut-out part 22b can be relatively small compared to that provided for the remainder 22a of the housing intermediate wall 22 and may even be eliminated. Since the junction 34 is a circular arc it can readily be machined with high precision so that a tight joint can be provided between the parts 22a and 22b of the intermediate wall 22. Screws 42 are provided for securing the parts 22a and 22b together to form a rigid intermediate wall 22 of uniform axial width.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A double rotary combustion engine having a cycle which includes the four strokes of intake, compression, expansion and exhaust; said engine comprising a housing having two spaced cavities with the inner surface of the peripheral wall of each cavity having a two-lobe profile and with the two-lobe profiles of said cavities being axially alined; a shaft extending co-axially through said cavities and having a pair of axially-spaced eccentric portions, one for each of said cavities; a pair of rotors each journaled on one of said eccentric portions for planetary rotation within the associated cavity, said two eccentric portions being rotatively offset 180° and each rotor having three circumferentially-spaced apex portions, each having sealing engagement with said peripheral wall to form a plurality of working chambers between said rotor and peripheral wall which rotate about said shaft and vary in volume during rotor rotation with the rotative position of each rotor about its axis being rotatively offset 60° from the rotative position of the other rotor about its axis, each housing cavity having an air inlet port and an exhaust gas outlet port for said working chambers with said inlet ports being disposed one behind the other when viewed in a direction parallel to the shaft axis and said outlet ports being similarly disposed; and gearing disposed only at the remote end faces of the two rotors for coupling the rotors to the housing, said gearing including a pair of internal gears, one for each rotor with each internal gear being secured to its rotor at an end face thereof remote from the other rotor and with the two adjacent end faces of the rotor being free of any gearing, and a pair of annular fixed gears, one for and disposed in meshing engagement with each of said internal gears with each fixed gear being secured to the housing and being co-axially disposed about the adjacent portion of the shaft, the diameter of the shaft between said eccentric portions being greater than the internal diameter of said annular fixed gears.

2. A double engine as recited in claim 1 in which said housing has a wall between its two said cavities and said wall has a common inlet passage communicating with the inlet ports of said cavities, said ports opening into said cavities thru said wall, and including a single carburetor for said common inlet passage.

3. A quadruple engine comprising two double engines, as recited in claim 1, co-axially disposed with the profiles of all their housing cavities being axially alined and with their crankshafts being connected together in series so that they are rotatively offset 180°.

4. A quadruple engine comprising two double engines, as recited in claim 1, co-axially disposed with the profiles of all their housing cavities being axially alined and with their crankshafts being connected together in series so that they are rotatively offset 90°.

5. A quadruple engine comprising two double engines, as recited in claim 1, co-axially disposed with the profiles of the housing cavities of the one double engine being rotatively offset 90° from those of the other double engine and with their crankshafts being connected together in series so that they are rotatively offset 180°.

6. A multiple engine comprising two double engines, as recited in claim 1, combined together with the profiles of the housing cavities being axially alined and the two adjacent cavities of the two engines being combined into a single cavity of double width and with their crankshafts being connected together in series so that they are rotatively offset 180°.

7. A quadruple engine comprising two double engines as claimed in claim 1 and in which said engines are co-axially disposed with the multi-lobe profiles of said housing cavities being alined one behind the other when viewed in a direction parallel to the engine axis.

8. A quadruple engine comprising at least two double engines as claimed in claim 1 and in which said engines are coaxially disposed and have a common shaft.

9. A quadruple rotary combustion engine comprising four engine units each having a cycle which includes the four strokes of intake, compression, expansion and exhaust; said engine comprising a shaft having first, second, third and fourth axially-spaced eccentric portions, said eccentric portions being rotatively displaced relative to each other such that, as viewed from one end of the shaft, the relative rotative displacement of the first and second eccentric portions is 180°, the relative rotative displacement of the third and fourth eccentric portions is 180° and the relative rotative displacement of the second and third eccentric portions is 90°; a housing structure providing four axially-spaced cavities with the peripheral wall of each cavity having a two-lobe profile, the two-lobe profiles of said cavities being alined one behind the other when viewed in a direction parallel to the shaft axis and there being one such cavity for each shaft eccentric portion; and first, second, third and fourth rotors journaled on first, second, third and fourth shaft eccentric portions respectively for planetary motion within the associated cavity with the rotative positions of the first and third rotors about their axes being rotatively offset 60° from the rotative positions of the second and fourth rotors respectively about their axes and with the rotative positions of the first and second rotors about their axes being rotatively offset 30° from the rotative positions of the third and fourth rotors respectively about their axes, said rotors each having three circumferentially-spaced apex portions; one more in number than the number of said lobes with each apex portion having sealing engagement with its housing cavity peripheral wall to form a plurality of working chambers between said rotor and peripheral wall which rotate about said shaft and vary in volume during rotor rotation, each said housing cavity having an air inlet port and an exhaust gas outlet port for its associated working chambers with said inlet ports being disposed one behind the other when viewed in a direction parallel to the shaft axis and said outlet ports being similarly disposed.

10. A quadruple engine as claimed in claim 9 and in which the rotative displacements of said shaft eccentric portions is such, that when viewed from one end of the shaft, the rotative displacements of the second, third and fourth eccentric portions relative to the first eccentric portion is 180°, 90° and 270° respectively in the direction of rotation.

11. A multi-unit rotary combustion engine comprising a pair of engine units with each having a cycle which includes the four strokes of intake, compression, expansion and exhaust; said engine comprising a housing structure providing two axially spaced and coaxially arranged cavities with the peripheral wall of each cavity having a multi-lobe profile; a rotatable shaft extending coaxially through said cavities and having two eccentric portions, one for each of said cavities; two rotors each journaled on one of said eccentric portions for planetary rotation within its associated cavity, said housing structure having an air inlet port and an exhaust gas port for each of said cavities and said rotors each having a plurality of circumferentially spaced apex portions; one more in number than the number of said lobes with each apex portion having sealing engagement with the peripheral wall of its associated cavity to form a plurality of working chambers between each rotor and peripheral wall which rotate about said shaft and vary in volume during the planetary rotation of the rotor so that each chamber goes through the successive strokes of intake, compression, expansion and exhaust, the said multi-lobe profile cavities, inlet ports and exhaust ports of the housing structure and said shaft eccentric portions being positioned and correlated with respect to each other relative to the direction of rotation of said shaft that the expansion strokes in the working chambers of said plurality of engine units occur in equal number in equally spaced relationship during each rotation of the shaft; and gearing disposed only at the remote end faces of the two rotors for coupling the rotors to the housing, said gearing including a pair of internal gears, one for each rotor with each internal gear being secured to its rotor at an end face thereof remote from the other rotor and with the two adjacent end faces of the rotor being free of such gearing, and a pair of annular fixed gears, one for and disposed in meshing engagement with each of said internal gears with each fixed gear being secured to the engine housing structure and being co-axially disposed about the adjacent portion of the shaft, the diameter of the shaft between the shaft eccentric portions being greater than the internal diameter of said annular fixed gears.

12. A double rotary combustion engine having a cycle which includes the four strokes of intake, compression, expansion and exhaust; said engine comprising a housing having two spaced cavities with the inner surface of the peripheral wall of each cavity having a multi-lobe profile, the multi-lobe profiles of said cavities being axially alined; a shaft extending co-axially through said cavities and having a pair of eccentric portions, one for each of said cavities; a pair of rotors each journaled on one of said eccentric portions for planetary rotation within the associated cavity, said two eccentric portions being rotatively offset 180° and each said rotor having a plurality of circumferentially-spaced apex portions, one more in number than the number of said lobes with each apex portion having sealing engagement with said peripheral wall to form a plurality of working chambers between said rotor and peripheral wall which rotate about said shaft and vary in volume during rotor rotation, each said housing cavity having an air inlet and an exhaust gas outlet port with said inlet ports being axially alined and with said outlet ports being axially alined; said housing having a common wall separating said two cavities and said shaft having a one-piece construction, said common housing wall providing a bearing for said one-piece shaft and comprising two parts joined together along a circular arc which extends from diametrically opposite sides of said shaft with the inlet ports of the two cavities being included within said circular arc.

13. A double rotary combustion engine as claimed in claim 1 and in which said shaft and its two eccentric portions have a one-piece construction.

References Cited in the file of this patent
UNITED STATES PATENTS

| | | |
|---|---|---|
| 1,434,446 | McQueen | Nov. 7, 1922 |
| 2,066,394 | Daub | Jan. 5, 1937 |
| 2,988,065 | Wankel et al. | June 13, 1961 |

FOREIGN PATENTS

| | | |
|---|---|---|
| 890,084 | France | Oct. 25, 1943 |
| 1,125,876 | France | July 16, 1956 |
| 557,902 | Great Britain | Dec. 9, 1943 |